United States Patent Office 2,925,145
Patented Feb. 16, 1960

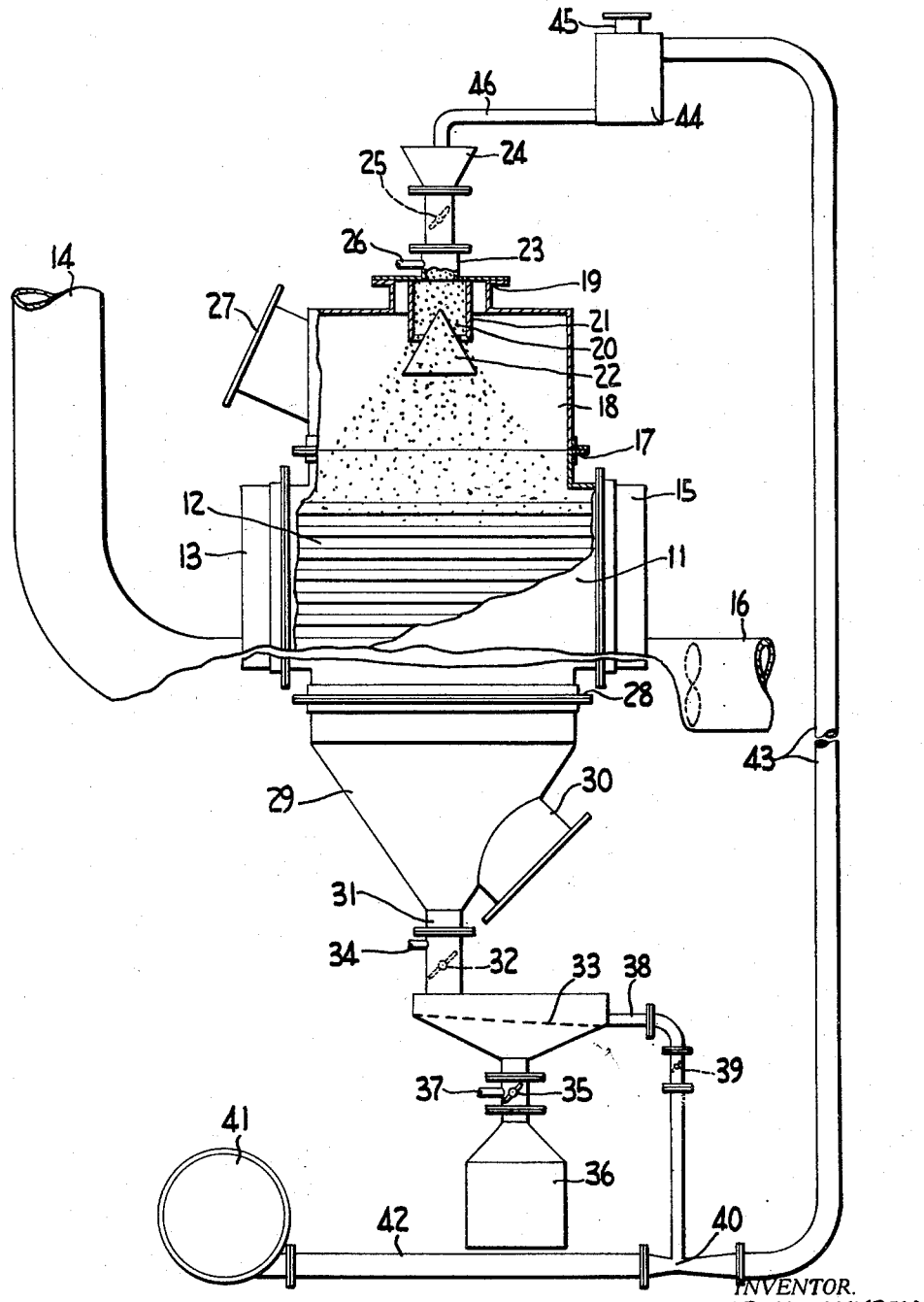

2,925,145

SEPARATION OF METALLIC HALIDES

John Hayden, Middlesborough, England, assignor to British Titan Products Company Limited, York, England, a British company Application August 3, 1955, Serial No. 526,116

Claims priority, application Great Britain August 6, 1954

3 Claims. (Cl. 183—119)

This invention is for improvements in or relating to the separation of metallic halides and has particular reference to a process of condensing or precipitating ferric chloride or other halides which are in a solid state about or above the boiling point of titanium tetrachloride from gases derived from the chlorination of titanium-bearing material.

Many processes have been described for the chlorination of titanium-bearing materials and for the separate recovery of the principal chlorides contained therein. These processes consist essentially in reacting titanium-bearing ore contained either in a shaft, rotating, or hearth furnace with chlorine or chlorine-containing gases in the presence of a reducing agent which may be admixed with the solid as, for instance, carbon or certain metallic substances or may be contained in the gas in the form of carbon monoxide. The temperature of the reaction is usually of the order of 900 to 1100° C. and the gases emerging from the chlorinator consist essentially of titanium tetrachloride and ferric chloride, chromium chloride, zirconium chloride, vanadium chloride and silicon chloride of which latter the ferric chloride is usually in the largest proportion together with carbon dioxide, carbon monoxide, some chlorine and hydrogen chloride and other gases which may be introduced with the chlorine or may be otherwise admitted or occur in the chlorination operation. Additionally contained in these gases will be small proportions of dust mainly consisting of fine particles of unreacted ore or carbon or other solid constituent originally present in, or admitted to the chlorinator.

Various processes have been suggested for the cooling of these gases and the separation of the various constituents. Of these processes, it has been preferred to remove, if necessary, the solid constituents such as un-reacted ore and coke by passage through a cyclone either before or after cooling the gases to a temperature above which the principal normally solid chloride constituents will condense. This initial cooling is conducted in a variety of ways dependent e.g. on the size of the chlorinator. Methods which have been suggested for this include indirect cooling either through the ducting in the case of a small output plant or by passage through vessels which are externally cooled by jackets or internally cooled by means of coils through which coolant fluid is passed and in such cases, preferably in some form of apparatus such as fluid bed, so as to avoid contact of metal apparatus with the hotter gases. Direct means of cooling include injection of liquids such as titanium tetrachloride or other suitable liquid which will not react with the gaseous constituents or admission of ferric chloride or mixtures thereof with titanium tetrachloride which will evaporate under the temperature conditions or injection of cold inert gases (preferably gases which have been recycled from a cooler stage of the condensation circuit). In this operation the principal constituents, viz. ferric chloride and titanium tetrachloride are still in the vapour phase and the cooling is thus normally conducted to temperatures of the order of 250° to 300° C. This preliminary cooling operation is not, in all cases, essential but, as will be seen in the following description, it is preferred, since in subsequent condensation stage, to remove the ferric chloride, metal cooling surfaces are often selected and these would, in some circumstances, be unsuitable on account of heavy corrosion if the hotter gases were admitted. It is obvious, however, that the temperature to which the hot gas is cooled is relatively arbitrary as long as corrosion does not interfere or excessively large metal cooling surfaces are not, in consequence, required.

The indirect cooling of chlorinator gases to precipitate ferric chloride and other chlorides which condense directly to the solid state has been previously described and methods have also been disclosed for removing incrustations forming on the coolers by means of scrapers and other devices. Such methods, however, have not only been complicated but have proved to be mechanically difficult to conduct and ultimately unsuitable for regular plant operation.

It is an object of the present invention to provide a process for cooling gases derived from the chlorination of titanium-bearing materials in order to separate those constituents which normally condense directly to the solid state (in particular ferric chloride) from the constituents that normally condense to the liquid state (in particular titanium tetrachloride).

According to the present invention there is provided a method of cooling gases derived from the chlorination of titanium-bearing materials which method comprises passing the hot gases through a chamber provided with a plurality of horizontal or substantially horizontally disposed tubes internally cooled so that their external surfaces are at a temperature above the dew point of titanium tetrachloride in order to condense those constituents of the chlorination gases which condense directly to the solid state and periodically or continuously cleansing the surfaces of the tubes from solid constituents condensed thereon by dropping shot through the chamber.

The tubes are conveniently arranged one layer above the other in parallel banks.

Preferably before the application of the process of the present invention the chlorination gases are subjected to a primary cooling operation to cool them to a temperature of the order of 250° to 300° C. They are then cooled by the process of the present invention to a temperature above the dew point of titanium tetrachloride e.g. of the order of 150° to 170° C. with resultant precipitation of the ferric chloride constituent.

The shot dropping through the chamber and carrying with it some of the solid condensed material may be separated from the material by sieving (e.g. by a vibrating screen) and returned to the top of the cooling chamber for further use, e.g. by means of an air lift.

The term shot is used herein to denote particles whose average size varies from approximately ⅛" to ½" in diameter of iron or other metal, ceramic or heavy bodies consisting of materials inert to the process conditions. The particles are preferably spherical but may also be punchings or less regularly shaped bodies referred to generally as "shot," "pellets" or "balls."

As hereinafter described, the shot at the base of the cooling chamber may be separated by means of a vibrating screen. The shot discharged as oversize from the screen may be delivered by means of air or other pneumatic lifting medium to a collecting vessel above the cooling chamber. The lifting medium may then be separated from the shot and the latter discharged by gravity directly to the top of the cooling chamber for further use in the cooling process of the invention.

The vibrating screen may be maintained out of contact with the atmosphere and corrosive gases may be removed by the admission of dry air or other inert gas to the surface of the vibrating screen, such air or gas being admitted countercurrent to the falling shot entering the screen.

The air or other pneumatic lifting medium for delivering the screened shot to the collecting vessel is thereafter vented to atmosphere either directly or after suitable purification or scrubbing.

The temperature of the external surfaces of the cooling tubes may be controlled by the rate of passage and temperature of the internal cooling fluid. The preferred temperature of the external surfaces of the cooling tubes is from 70° C. to 130° C.

When air is employed as the cooling fluid it is convenient to pass the air through the tubes at a velocity of the order of 25 ft. per second at a temperature of from 90 to 110° C. to attain the desired temperature on the external surfaces of the tubes.

It is desirable to provide means to distribute the shot admitted to the cooling chamber evenly over the cross section of the chamber, for example by employing a hard metal conical distributor.

The process of the present invention employing falling shot to cleanse the cooling tube reduces the actual area required of cooling surface per unit of hot gas introduced with resultant increased efficiency in cooling.

By employing a system of flap valves to seal the ports of entry and exit of the shot and providing on the inner or non-atmospheric sides of the flaps dry air inlets, by suitable adjustment a buffer effect may be established preventing the escape of titanium tetrachloride and other objectionable gases to the atmosphere even when the flaps are open.

The diameter and spacing of the cooling tubes is preferably adjusted so that the momentum produced in the initial fall of the shot to the upper exposed row of tubing is maintained within the shot throughout its course down and through the cooler.

The circulation of heated air or other cooling fluid may be carried out at suitable velocities and temperatures to maintain a high heat transfer and obtain more uniform cooling; temperature variation on the outer surface of the cooling tubes leading to localised condensation of the titanium tetrachloride constituent may thus be avoided.

The invention may be more easily understood by reference to the accompanying drawing showing an elevation of a cooling apparatus (which is fragmentary and partly in section).

A cooling chamber or vessel 11 constructed in mild steel is of rectangular shape, and is provided with a plurality of horizontal cooling tubes 12, extending between a manifold 13 fed by ducting 14 on one side of the chamber and discharging on the other side to a corresponding manifold 15 connected with ducting 16. To a flange 17 at the top of this vessel is attached a chamber 18 having on the top a flanged opening 19 with a shot feeding distributor 20, the latter consisting of a vertical cylinder 21 with a cone 22 loosely restricting the lower end. The upper part of the cylindrical section is connected to a conduit 23 which connects in turn to a tundish 24 through a flap valve 25 below which a dry air purge is admitted at 26. Also to the chamber 18 is affixed on one side a flanged port 27 through which the chlorination gases enter the cooling chamber 11. At the bottom of the cooling chamber 11 is a circular flange 28 to which is attached an inverted conical section 29 which has a side exit 30 for discharge of the cooled chlorination gases, and a bottom discharge port 31 with a flap valve 32 for discharge of the shot and solid condensate on to a vibrating screen 33. Above the flap valve 32 a dry air purge is attached at 34. The fine condensate of solids passing through the vibrating screen 33 is discharged through a flap valve 35 leading into a sealed collecting container or other device 36 whereby the ferric chloride does not come into direct contact with the atmosphere. A dry air purge 37 is attached above the valve device to prevent titanium tetrachloride fumes from entering vessel 36. The shot overflowing from the screen 33 via a conduit 38 falls into the throat of a venturi 40 where it encounters an air or other gas stream, delivered from a fan 41 through a conduit 42. The air stream delivered by the fan should be desiccated if the solids discharged from the vibrating screen are unduly contaminated by chlorides which will react (e.g. titanium tetrachloride). The air stream may be preheated, if necessary, to avoid cooling of the shot or to elevate the temperature of the shot so that on re-entry into the system it does not serve as a condensing surface for the titanium chloride constituent. The source of hot air admitted to the fan 41 may be derived from the exit duct 16 if air is used as a coolant fluid passing through the tubes 12. This air stream delivered by the fan transports the shot from the venturi 40 through a conduit 43 to a storage container 44 where the air is removed through a vent 45, the shot being recirculated through conduit 46 to feed into the tundish 24.

The position of the flap valve 32 with the inner adjacent air purge port 34 is optional; it could, for instance, be located in the conduit 38 as shown 39. The means of discharge of the ferric chloride are also optional.

The operation of the cooling process of the present invention with the apparatus described above is as follows:

The hot gases derived from chlorination of the titanium-bearing materials and containing principally titanium tetrachloride and ferric chloride entering the cooling chamber 11 at point 27 pass over the tubes 12 contained in the vessel 11 and pass outward through the cone section 29 and the exit 30 having been cooled in passing through the chamber to a temperature of 170° C. or slightly below, but above the dew point of the titanium tetrachloride constituent.

The tubes 12 may be cooled by warm or hot air or other cooling medium of which there is a wide selection, e.g. steam, water, oil or titanium tetrachloride either liquid or vapour. It is clear that in cooling with such fluids, heat recovery from the system is possible thus for example the plant could be utilized either as a boiler economiser or a steam raising plant or as the means of heating in a distillation plant for the purification of titanium tetrachloride. The most important feature to be observed in this cooling will be the maintenance of fluid velocities so that cooling over the tube surfaces will be uniform and efficient and localised over-cooling will be obviated. In this cooling operation the hot fluid, for instance, air, will pass through the conduit 14 into the manifold 13 through the various tubes 12 the latter, in turn, discharging into manifold 15 and into the conduit 16 where the air may be suitably bled off and replenished by cold air or, if it is desired, pass through a suitable cooler, e.g. an external water cooler, prior to re-circulation into conduit 14. The temperature of the air or cooling fluid entering at 14 and the velocity of the fluid circulated will be so adjusted that the temperature on the external surface of the tubes will be above the dew point of titanium tetrachloride, e.g. 70° C. to 130° C. Thus, when operating with, for instance, air, it is desirable to maintain the air passing through the tubes at a velocity of the order of 25 ft. per second and at temperatures of the order of 90 to 110° C. When operating with steam the temperatures can be so controlled that condensation of titanium tetrachloride cannot take place on the outside surface and corrosion is also correspondingly reduced. In this way the chlorination gases entering at 27 will be cooled from about 250° C. to 300° C. to 170° C. or below and during this operation substantially the whole of the ferric chloride constituent will be precipitated. The ferric chloride so obtained is usually in fine particulate form, some of which remains dispersed in the gas phase and passes through the conduit 30 in what may be referred to as a colloidal dispersion or aerosol. During the operation, however, some proportion of the ferric chloride will be condensed on the cooling tubes 12. Such deposits will gradually tend to insulate the tubes, thus necessitating a cooler air or other fluid entering through the ducting and manifolds 14, 13, 12, 15 and 16 to establish the same heat transfer in the cooling of the chlorination gases within the vessel. When this insulation becomes so high as considerably to impair the heat transfer, steps must be taken to clean the tubes 12 and, the present invention employs a simple but practical scheme of cascading shot over and through the assembly of tubes so as to clean particularly the upper surfaces and remove sufficient ferric chloride to recover the former heat transfer efficiency. Thus, for instance, with clean tubes, we have found the coefficient of heat transfer to be approximately 3 to 4 B.t.u.'s per square foot per hour per degree Fahrenheit. After operating until the tubes have become incrusted with the deposit of ferric chloride it is found that the coefficient of heat transfer is reduced to 0.5 to 0.7 B.t.u.'s per square foot per hour per degree Fahrenheit. On cascading the shot through the cooling chamber for a certain period which will be more fully appreciated by the following example, the heat transfer coefficient for the surface is restored to 1.5 to 2.5 B.t.u.'s per square foot per hour per degree Fahrenheit. It will be understood that the cleansing of the tubes constitutes a type of shot cascade, the effectiveness of which must depend on the height of the discharge above the tubing and the relative distances apart of the tubes so that the scavenging takes place not only on the upper tubes but, owing to the momentum of the shot cascading down, each tube in turn will have a similar treatment.

The design and arrangement of the tubes allows considerable variation, thus the tubes may be placed in one layer above the other in parallel but staggered positions or they may be arranged in parallel banks. In the latter case there are obvious advantages, from the point of view of accessibility. The arrangement in which each layer of tubes is parallel with respect to the other is, however, not essential thus, for instance, each layer may be constructed at right angles to the other.

The shot on leaving the cooling tubes 12 will be collected in the cone section 29 and will thereafter pass through the discharge conduit 31 where, by meeting a countercurrent of inert gas, it will be freed from objectionable fumes before falling on to the vibrating screen 33. The inert gases will be admitted at 34 at a velocity which will just overcome the pressure of gases within the cooler. The shot admixed with the aggregated ferric chloride removed from the cooler will be separated, the ferric chloride passing through the screen and the shot passing onward through the ducting 38 to the venturi 40. At this point, air which may be pre-heated and, if necessary, dried, will be fed by the fan 41 at a velocity sufficient to elevate the solids to the separator or storage container 44.

Following is a description by way of example of a method of carrying the invention into effect.

*Example*

A heat exchanger apparatus was constructed as described above and shown in the accompanying drawing. The total heat exchange surface was 832 square feet provided by 252 tubes each 5 ft. long and 2⅜ inches in external diameter arranged in parallel banks of 18 tubes at 4 inch pitch, i.e. 18 superimposed layers of parallel tubes, the lateral pitch being 4 inch.

The shot used consisted of reject ball bearings approximately 3/16 of an inch in diameter. These passed from separator 44 through conduit 46 and flap valve 25 provided to prevent the exit of gas from the cooler to the atmosphere, and were allowed to fall on to the surface of the hard metal cone 22 which effectively distributed the falling shot over the tube bank below. From the base of the heat exchanger the shot passed through conduit 31 also having a flap valve 32 on to the flexibly mounted sieve 33 which was provided with a screen with ⅛ inch openings. The shot was re-circulated by allowing it subsequently to fall into the throat of the venturi 39 to which air was supplied by means of a fan capable of producing an air velocity of 120 ft. per second to elevate it 25 ft. via the lift pipe 43 to the separator or storage container 44 where the air was discharged to atmosphere. In this example the air delivered from the fan for the "air lift" did not enter the main cooling chamber or ducting so that inconvenience due to its moisture content reacting with the chlorination gases did not arise. At the same time there was no appreciable escape of titanium tetrachloride with the shot. The air also was not pre-heated. When the shot was circulating it was found necessary to purge the exit and inlet conduits 23 and 31 with dry air from 26 and 34 respectively in quantity amounting approximately to 15 c.f.m. in each case, thus sufficing to prevent escape of titanium chloride and other obnoxious gases from the cooler.

In operation, the gases produced by the chlorination of rutile which had previously been chilled in a primary cooler (by the admission of a spray of liquid titanium tetrachloride) entered the heat exchanger through conduit 27 at a temperature of 305° C. The quantity entering was equivalent to 5,645 lbs. an hour of which 4,925 lbs. was titanium tetrachloride in vapour form, the balance of the gas being largely carbon dioxide and other gases and vapours from the chlorinator, particularly ferric chloride.

The plant was operated to cool the gases to a temperature of 150° C. as at this temperature substantially all the ferric chloride contained in the inlet gas in the vapour phase was condensed as a solid and the temperature was still well above the dew point, 117° C. of the titanium tetrachloride. To attain the exit temperature 54,000 kilo calories an hour were removed from the gases and this was accomplished using air as the indirect cooling medium. The air which was circulated at a rate of 500 lbs. per minute and thus attained a velocity of 25 feet per second through the tubes, entered the manifold 13 at 95° C. and was discharged from the manifold 15 at about 110° C. In this operation there was no evidence of condensation of titanium tetrachloride on the outside or external tube surfaces contacting the chlorination gas stream.

After operating for three hours it was found that the efficiency of cooling had fallen off. Thus, the chlorination gas stream temperature had risen to 160° C. and there was a corresponding drop in the temperature at the exit of the coolant air stream. At this point the shot circulation system was brought into operation without interruption of process. The shot was circulated at the rate of 20 to 30 lbs. per minute for a period of ten minutes after which the conditions of heat transfer were restored to the former state. During the re-circulation of shot the screen 33 was vibrated by means of a high frequency electric vibrator and a very easy and simple separation was achieved.

The ferric chloride collected amounted to 8 lbs. per hour which represented 30% of the total emerging from the chlorinator, the remainder being entrained in the gases leaving through the port 30.

I claim:
1. A method of recovering solid iron chloride from a mixture of iron chloride and titanium tetrachloride vapors comprising; passing said mixture of vapors downwardly through a zone and over a cooling surface surrounding a second zone and extending across said first-named zone in the path of flow of said vapors; passing a cooling fluid through said second-named zone to maintain the temperature of said cooling surface at such a point that the vapors are cooled to a point below the condensation temperature of iron chloride vapor, but above that of the dew point of titanium tetrachloride thereby depositing solid iron chloride on said cooling surface to cover said surface; introducing a plurality of non-volatile, inert solid bodies heated to a temperature above the dew point of titanium tetrachloride into said first-named zone at a point therein above said cooling surface; dropping said heated solid bodies upon said cooling surface to dislodge said deposited solid iron chloride and re-expose said surface; removing the titanium tetrachloride vapors from said first-named zone and separately removing said dislodged solid iron chloride and said heated solid bodies as a mixture from said first-named zone at a point below said cooling surface; and separating said dislodged solid iron chloride from said heated solid bodies, and recovering said solid iron chloride.

2. The method of claim 1 wherein said mixture of vapors is passed over a plurality of said cooling surfaces, each of which is spaced from the remaining of said surfaces.

3. The method of claim 1 wherein said non-volatile, inert solid bodies are reheated to a temperature above the dew point of titanium tetrachloride after being separated from said solid iron chloride; and re-introduced into said first-named zone.

References Cited in the file of this patent

UNITED STATES PATENTS

| 2,580,635 | Winter | Jan. 1, 1952 |
| 2,675,889 | Frey | Apr. 20, 1954 |
| 2,718,279 | Kraus | Sept. 20, 1955 |
| 2,721,626 | Rick | Oct. 25, 1955 |

FOREIGN PATENTS

| 151,133 | Australia | Apr. 28, 1953 |

OTHER REFERENCES

Perry: "Chemical Engineers' Handbook," 1950, pages 661, 664 and 1130.